(12) United States Patent
Woerner

(10) Patent No.: US 6,309,094 B1
(45) Date of Patent: Oct. 30, 2001

(54) PROJECTION HEADLIGHT WITH ROTATABLE REFLECTOR AND LIGHT SOURCE AND ILLUMINATION DEVICE FOR A VEHICLE CONTAINING SAME

(75) Inventor: Bernhard Woerner, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/670,726

(22) Filed: Sep. 27, 2000

(30) Foreign Application Priority Data

Sep. 28, 1999 (DE) .............................. 199 46 350

(51) Int. Cl.[7] ...................................... B60Q 1/00
(52) U.S. Cl. .................. 362/539; 362/465; 362/514; 362/523
(58) Field of Search .................... 362/465, 466, 362/523, 525, 526, 513, 538, 539, 514

(56) References Cited

U.S. PATENT DOCUMENTS 4,827,388 * 5/1989 Miyazawa ............................ 362/513
5,909,949 * 6/1999 Gotoh ................................... 362/465
5,915,829 * 6/1999 Kalze et al. ......................... 362/513

FOREIGN PATENT DOCUMENTS 1 580 740    2/1974   (DE) .

* cited by examiner

Primary Examiner—Stephen Husar
(74) Attorney, Agent, or Firm—michael J. Striker

(57) ABSTRACT

The projection headlight has a reflector (10), a light source (20) arranged in a peak region of the reflector, a stop or mask (30) arranged in front of the reflector and a projection lens (40) arranged in front of the stop or mask. The reflector (10) and the light source (20) are pivotally mounted and connected with each other so as to rotate together about a rotation axis (60) arranged in the vicinity of a second principal point of the projection lens (40). The illumination device has at least two of these projection headlights, advantageously on opposite sides of the vehicle. The angular orientations of the reflectors (10) are controlled independently of each other in the illumination device.

15 Claims, 7 Drawing Sheets

FIG. 6a  RIGHT HEADLIGHT
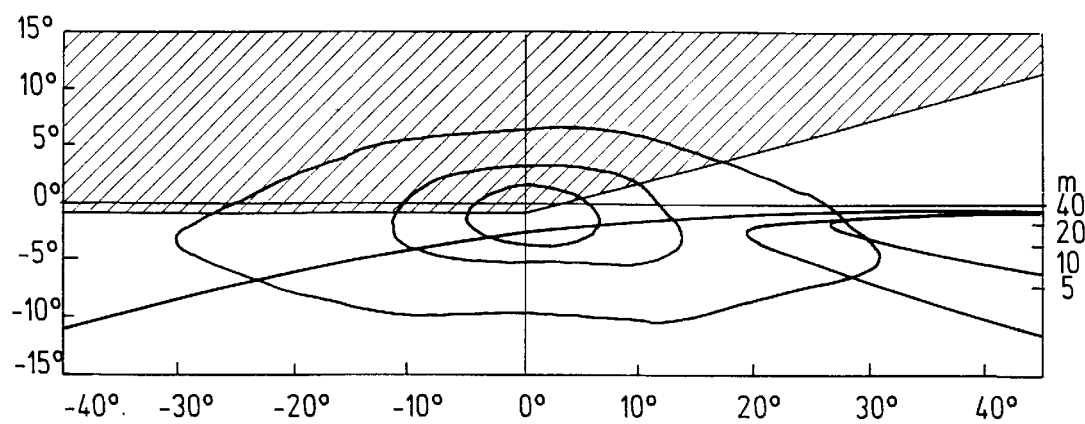
Fig. 6b  LEFT HEADLIGHT
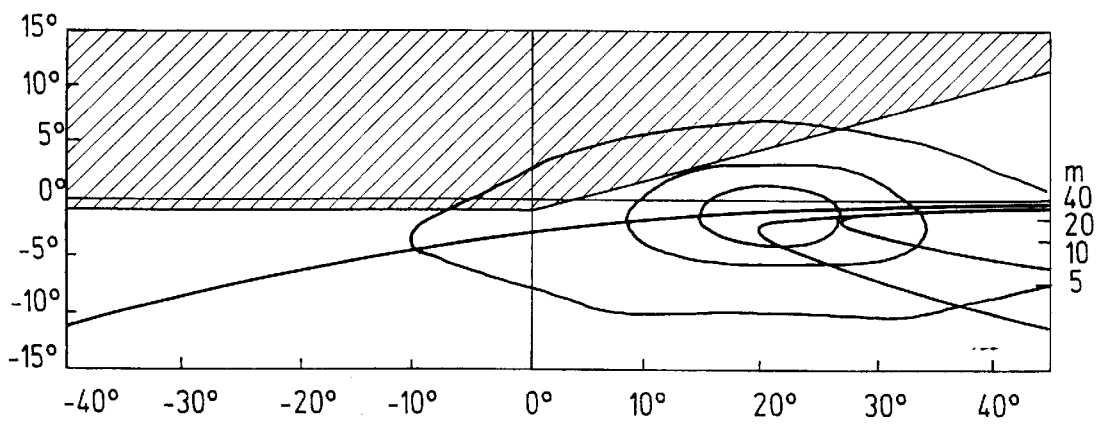

Fig. 7a STRAIGHT TRAVEL PATH
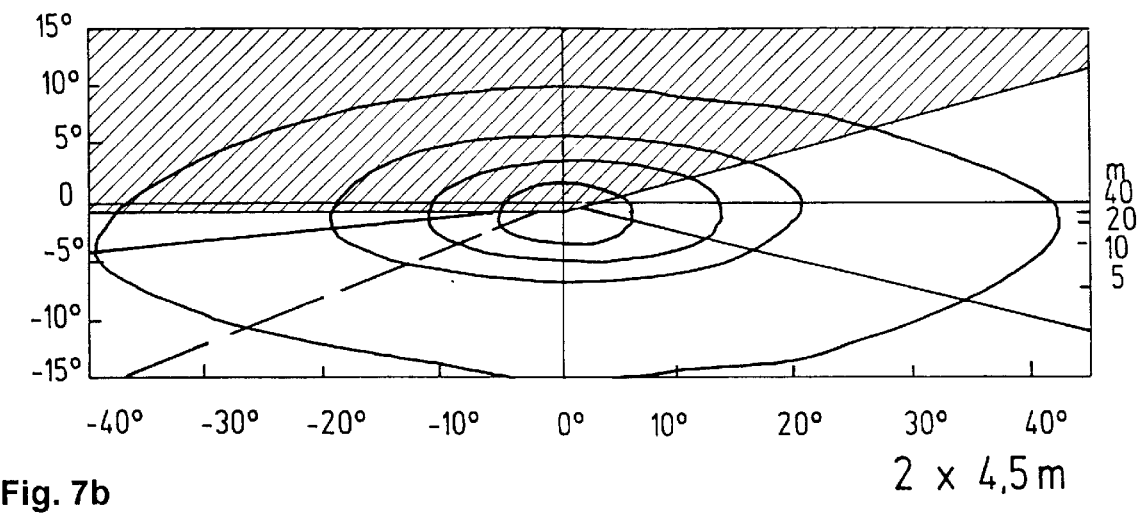
Fig. 7b RIGHT CURVED TRAVEL PATH
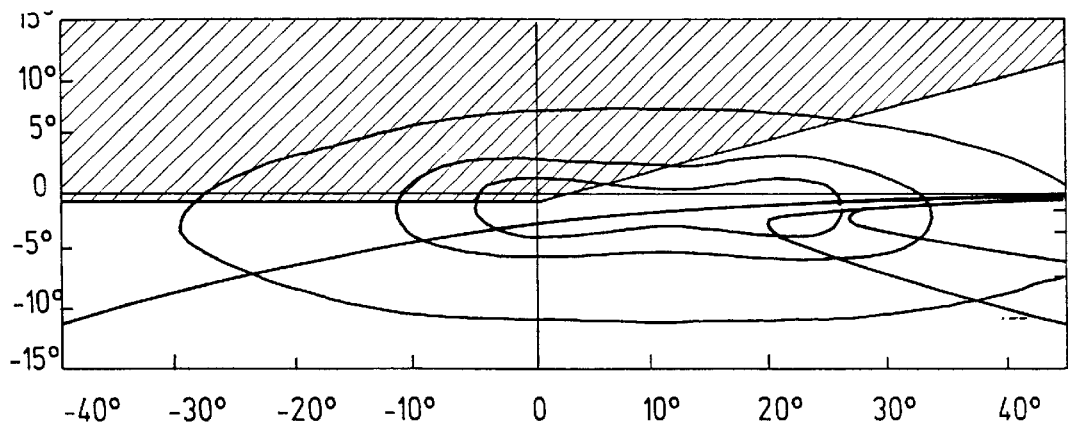
HORIZONTAL ANGLE

PROJECTION HEADLIGHT WITH ROTATABLE REFLECTOR AND LIGHT SOURCE AND ILLUMINATION DEVICE FOR A VEHICLE CONTAINING SAME

BACKGROUND OF THE INVENTION

1. Field of the Invention

The present invention relates to a projection headlight for a vehicle, particularly a motor vehicle, including a reflector, a light source mounted in the reflector peak region, at least one stop or mask arranged in front of the reflector and a projection lens arranged in front of the stop or mask. It also relates to an illumination device for a motor vehicle including at least two of these projection headlights, particularly on opposite sides of the vehicle.

2. Prior Art

Because of the only limited available light intensities that they produce headlights for motor vehicles are designed to illuminate a straight section of road of a customary width. The comparatively large light intensities required for visibility purposes are concentrated on the right side of the street at a distance of about 50 m in front of the motor vehicle. During travel of the vehicle around a curve it is appropriate to laterally shift the direction of propagation of the maximum light intensities.

A lighting device for a motor vehicle is described in DT 1 580 740 with rotatably mounted headlights, which provides curve illumination of the curved path of a vehicle travelling around a curve. The entire headlight is rotatable about an at least approximately vertical axis in the frame of the vehicle in this lighting device. The headlight has a connecting drive cooperating with the vehicle steering gear so that the steering gear pivots the headlight in the same direction as, but with a greater angle than, the wheels of the vehicle. The connecting drive for each headlight includes a lever coupled with the steering gear and which performs a pivoting motion about its rotation axis following the steering motion, a fixed element connected to the headlight and a tie rod connecting the fixed element and the lever with spacing from the connecting point from the rotation axis.

In addition, an apparatus including a smaller additional rotationally mounted headlight is known for producing the direction-dependent portion of the illumination.

The problem with devices of the foregoing type is that they require a comparatively large amount of space for their pivoting or rotating parts. Furthermore they have a comparatively large weight and a comparatively large and massive mounting in order to take the comparatively large weight, retaining and drive forces.

Furthermore in order to be able to rotate the entire headlight a gap must be provided between the headlight component group and the covering frame connected with it, which permits rotation of the headlight. This kind of gap is considered to be undesirable in many cases because of its effect on the appearance of the headlight.

Finally also the portions of the light propagated from the rotatable headlight above the permissible light-dark boundary with low beam light, which also may then be rotated into the angular range, in which only certain light intensity values are allowed on account of the opposing traffic, are problematic or troublesome.

SUMMARY OF THE INVENTION

It is an object of the present invention to provide a headlight for a vehicle of the above-described type and an illumination device for a vehicle of the above-described kind, which do not have the above-described disadvantages.

It is a further object of the present invention to provide an illumination device for a vehicle of the above-described kind including at least two projection headlights, in which it is possible to rotate each headlight independently of each other with weight forces, retaining forces and drive forces that are smaller than with prior art rotatable headlights.

These objects and others, which will be made more apparent hereinafter, are attained in a projection headlight for a vehicle, especially a motor vehicle, which comprises a reflector, in whose peak region a light source is mounted, at least one stop or mask arranged in front of the reflector and a projection lens arranged in front of the at least one stop or mask.

According to the invention the projection headlight has a reflector and a light source, which are both pivotally mounted so as to rotate together about a rotation axis arranged in the vicinity of the second principal point of the projection lens.

These objects and others, which will be made more apparent hereinafter, are further attained in an illumination device for a vehicle, especially a motor vehicle, with at least two of the aforesaid projection headlights with respective rotatable reflectors and light sources.

According to the invention the illumination device includes means for rotating the respective rotatable reflectors independently of each other and according to a motion state of the vehicle.

In the projection headlight according to the invention only optical components that cooperate to shape or form part of the propagated light beam or light intensity distribution move, so that essentially smaller weight, retaining and drive forces arise, whereby the mounting arrangement for the reflector can be smaller. Moreover a motion gap between the headlight and the cover frame surrounding it can be dispensed with, since the projection lens is held in a fixed position during rotation of the beam-forming optical components. Because of the fixed stop or mask the above-described parts of the light beam or intensity distribution do not enter or reach an angular region in which only strict or limited light intensities tolerances are permitted on account of the opposing traffic.

The lighting device according to the invention has the advantage that optimum illumination of the vehicle travel path is provided by separately controlling the respective reflectors of the headlights according to the vehicle motion state in each travel situation.

Advantageous embodiments of the invention are also the subject matter of the dependent claims.

For example, in one embodiment of the projection headlight of the invention the rotation axis of the reflector is vertically oriented.

The stop or mask of the projection headlight of the invention is preferably formed to have a Petzval curvature with respect to the projection lens. Because of that shape for the stop or mask, on the one hand, the rotational motion of the reflector is not hindered or blocked. On the other hand, the distance between the reflector and the stop or mask can be kept small, so that the reflector can be comparatively large and can gather as much light as possible. Moreover the required sharpness and contrast of the light-dark boundary produced by the lens to by imaging the stop are sufficiently large independently of the direction of the light beam coming from the reflector.

In an additional advantageous embodiment of the invention the rotation axis is inclined toward the rear, above, relative to vertical, so that during rotational motional of the reflector its peak is moved upward. Thus the greater light intensities in the provided light distribution are brought closer to the vehicle. This accounts for that fact that vehicles usually traverse curves with reduced speeds so that the visible areas in front of the vehicles are desirably and appropriately brought closer to them.

In order to obtain the desired effect with headlights that are pivoted over comparatively large horizontal pivot angle ranges (e.g. ±25°), the rotation axis is inclined about 3° to 10° toward the rear. The inclination angles of up to 40° can be provided for headlights with a horizontal pivot angle range of ±10°.

Furthermore the rotation axis for the headlight of the invention can also be inclined laterally from the vertical transverse to or across the longitudinal axis of the vehicle. With right-hand traffic in the propagation direction the vertical axis is inclined, above, to the left but with left-hand traffic it is inclined to the right. In this way the reflector peak with the light source moves downwards during horizontal rotation to the left, whereby the maximum light intensities of the light intensity distribution from the headlight are propagated further from the vehicle. Thus when the vehicle travels around a curve to the right in an embodiment of the headlight designed for right-hand traffic with a stop or mask open further on the left the light beam is propagated further or has a greater range. When the reflector is rotated to the right, on the other hand, the position of the light intensity maximum drops somewhat, whereby less light is blocked off by the stop or mask. With headlights designed for left-hand traffic the same is also true in a reverse manner.

In order to obtain the desired effect in headlights that are horizontally pivoted over a wide angular range (e.g. ±25°) the rotation axis of the reflector should be inclined about 0.5° to 1.5°. In contrast, with headlights with a horizontal pivot angle range of, for example, ±10°, the rotation axis of the reflector should be inclined about 1.5° to 3°.

By combination of the above-described longitudinal rearward and traverse orientation of the rotation axis of the reflector relative to vertical, i.e. for example by a left and rearward inclination, above, of the rotation axis, the above described advantages of both can be simultaneously attained.

Alternatively or in addition to the above-described inclined orientation of the rotation axis of the reflector the desired vertical shift of the light intensity maximum values can also be attained by means of a movable upper or lower bearing or mounting device for the reflector or by means of a cam wheel on which the reflector is guided vertically.

The invention also includes an illumination device including at least two projection headlights of the above-described type. In advantageous embodiments of this illumination device during travel of the vehicle around a curve only the reflector of the headlight on the outside of the curve is rotated. Because of the rotation of the headlight on the outside of the curve the light beams from the projection headlights are superimposed with a first headlight pointing in the direction of the vehicle longitudinal axis and a second headlight having the rotated reflector. Because of this superposition an intense wide total illumination is obtained and the illumination of the right vehicle travel path edge is widened and improved, especially when the vehicle travels around a tight curve and with reduced travel path width, for example in typical streets.

Furthermore in an advantageous preferred embodiment the illumination device has means for controlling the rotation of the reflectors of the headlights so that their light beam axes cross or intersection during comparatively slow travel below a certain predetermined limiting speed. The angles between the light beam axes during slow travel preferably amount to up to 20°. The headlights thus provide improved lateral illumination when the light beams are crossed in this manner. The control signal for rotating the reflectors is thus, for example, a speed-dependent control signal. Furthermore other types of control signals may be used, according to the various traffic situations.

BRIEF DESCRIPTION OF THE DRAWING

The objects, features and advantages of the invention will now be illustrated in more detail with the aid of the following description of the preferred embodiments, with reference to the accompanying figures in which:

FIGS. 6a and 6b are graphical illustrations showing the respective light intensity distributions for left and right projection headlights of the motor vehicle shown in FIG 5; and FIGS. 7a and 7b are graphical illustrations of respective light intensity distributions produced by the illumination device according to the invention.

DESCRIPTION OF THE PREFERRED EMBODIMENTS

Figure 1:
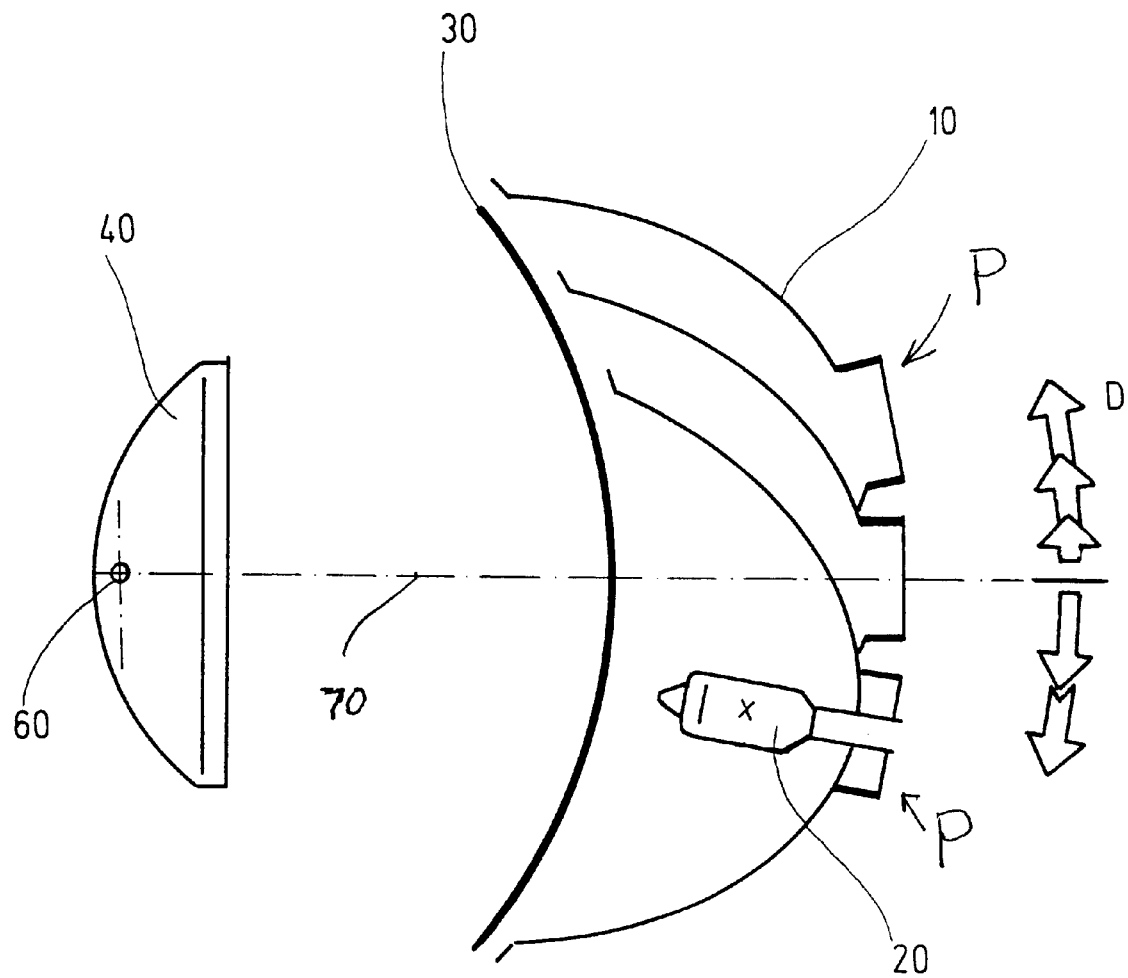
FIG. 1 is a diagrammatic central vertical cross-sectional action view through a first embodiment of a projection headlight according to the invention, showing pivoting of the reflector.

A projection headlight constructed according to the projection principle, shown in FIG. 1, comprises a reflector 10, with a light source, for example an incandescent bulb 20, mounted in its peak region P. A fixed or stationary stop or mask 30 and a projection lens 40 is arranged in front of the reflector 10. The stop or mask 30 can be constructed in the shape of part of a Petzval curve in relation to the projection lens 40, so that rotational motion of the reflector in the directions in the directions indicated by the arrows D in FIG. 1 is not prevented. In this way the spacing between the stop or mask 30 and the reflector 10 can be kept as small as possible so that the reflector can be formed as large as possible and so that it can gather as much light as possible. On the other hand, the required sharpness and contrast of the light-dark boundary formed by the projection lens 40 by imaging the stop or mask 30 are sufficiently high independently of the propagation direction of the light beam coming from the reflector 10.

The rotational motion of the reflector 10 occurs about a vertical rotation axis 60, which is arranged in the vicinity of the second principal point of the projection lens 40 of the headlight, so that the light beam issuing from the reflector 10 is continuously guided completely to the lens opening. Thus, in spite of reflector motion, no light loss occurs due to light not contributing to the illumination and passing by the projection lens 40.

The rotation axis 60 also can be inclined slightly backward or to the rear in relation to vertical, so that during rotational motion of the reflector its peak region P moves upward. Thus the greater light intensities of the light intensity distribution produced on the path over which the vehicle travels are brought in closer to the vehicle. Thereby the usual circumstance that vehicles travel with reduced speeds around curves is taken into account, whereby the illuminated area in front of the vehicle is desirably and appropriately moved closer to the vehicle.

The slightly inclined rotation axis 60 to vertical can be further inclined toward the left for right-hand traffic, so that the reflector peak P is moved downwards when the reflector 10 is rotated to the left relative to a longitudinal axis 70 of the vehicle. Thus the greatest light intensities on the illuminated area in front of the vehicle on the motion path of the vehicle are moved further from the vehicle because of that additional inclination toward the left. In this way a greater range is obtained for the light beam when the vehicle travels on a curved path for a curve to the right with a further leftward open stop 30 of a headlight designed for right-hand traffic. The maximum of the light intensity distribution is thus shifted up toward the right in this way. In contrast, during rotation of the reflector 10 toward the right the position of the light intensity maximum drops somewhat, so that only a small amount of light is blocked by the stop or mask 30 and thus more light is available.

Figure 2:
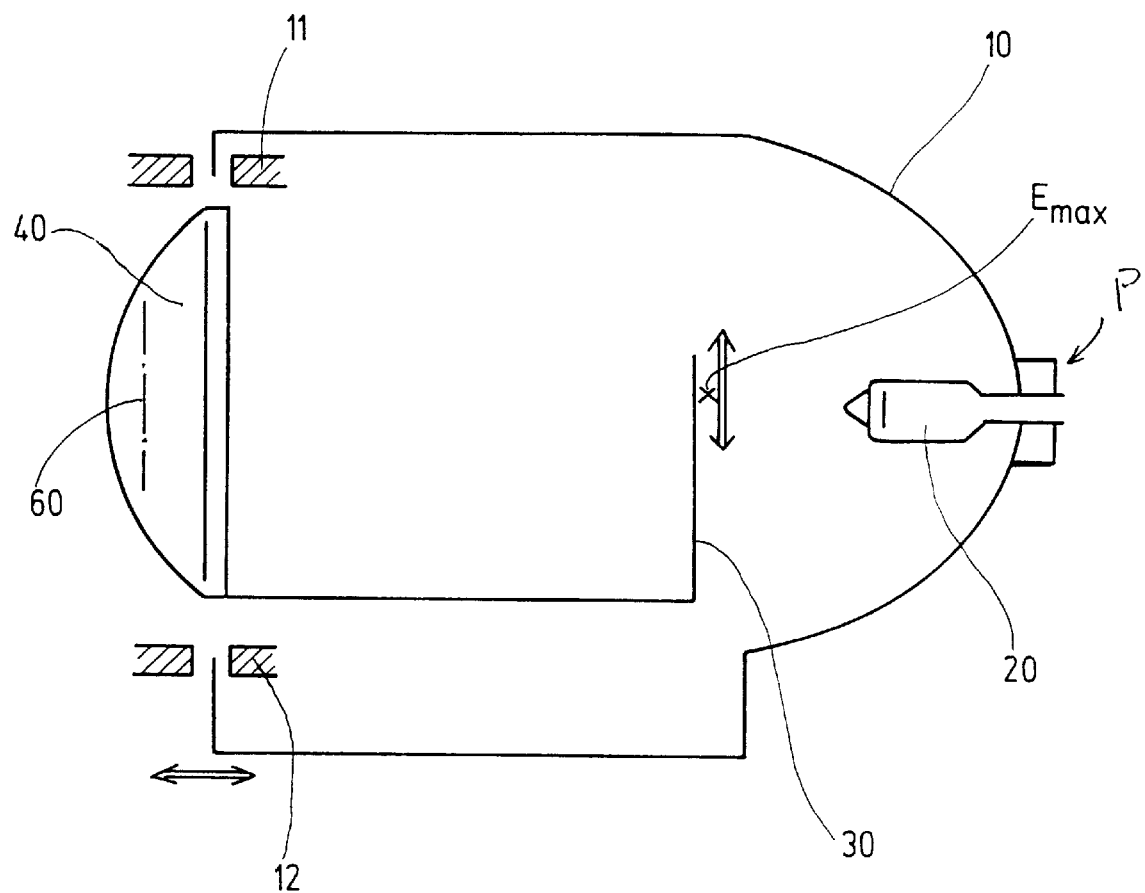
FIG. 2 is a diagrammatic central vertical cross-sectional view similar to FIG. 1 of the projection headlight, showing the mounting of the reflector.
Figure 3:
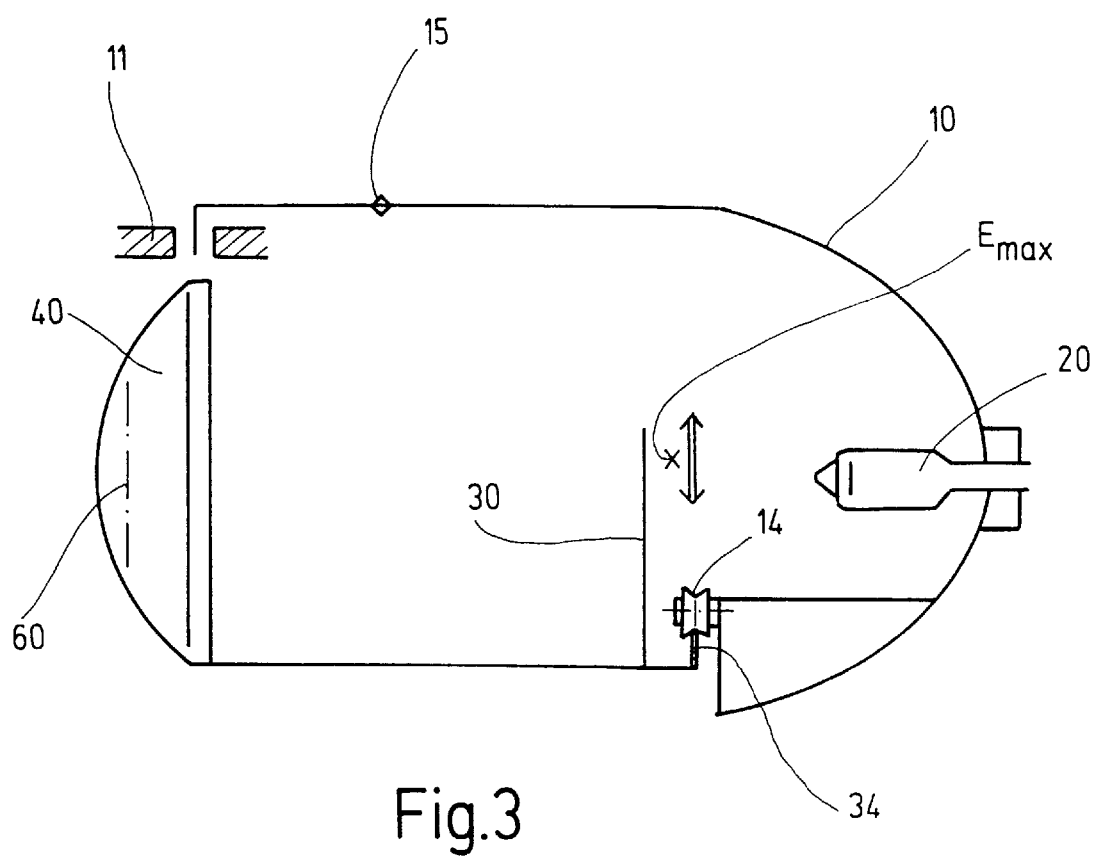
FIG. 3 is a diagrammatic central vertical cross-sectional view of an additional embodiment of the projection headlight according to the invention.

A desirable additional vertical shift of a position of maximum illumination intensity $E_{max}$, which is located in front of the reflector 10, as it is shown in FIG. 2, is obtainable alternatively or in addition to that obtained by the above-described inclination of the rotation axis. This additional vertical shift is obtained by means of a movable lower bearing 12 that travels in a longitudinal direction with a fixed upper bearing 11 or vice versa. It can also be obtained, as shown in FIG. 3, by means of a cam wheel 34, which can e.g. be part of the stop or mask 30 and on which the reflector 10 is guided vertically by means of a roller 14 or a slider. The engagement point reflector drive M (see also FIG. 5) is shown in FIG. 3 schematically with the reference number 15.

It is understood that by a combination of the above-described longitudinal and transverse inclination of the reflector 10, for example, to obtain a shift of the upper vertical rotation axis to the rear relative to vertical and to the left relative to longitudinal axis 70, the above-described advantages obtained with the longitudinal inclination and transverse inclination will be simultaneously obtained.

Figure 4:
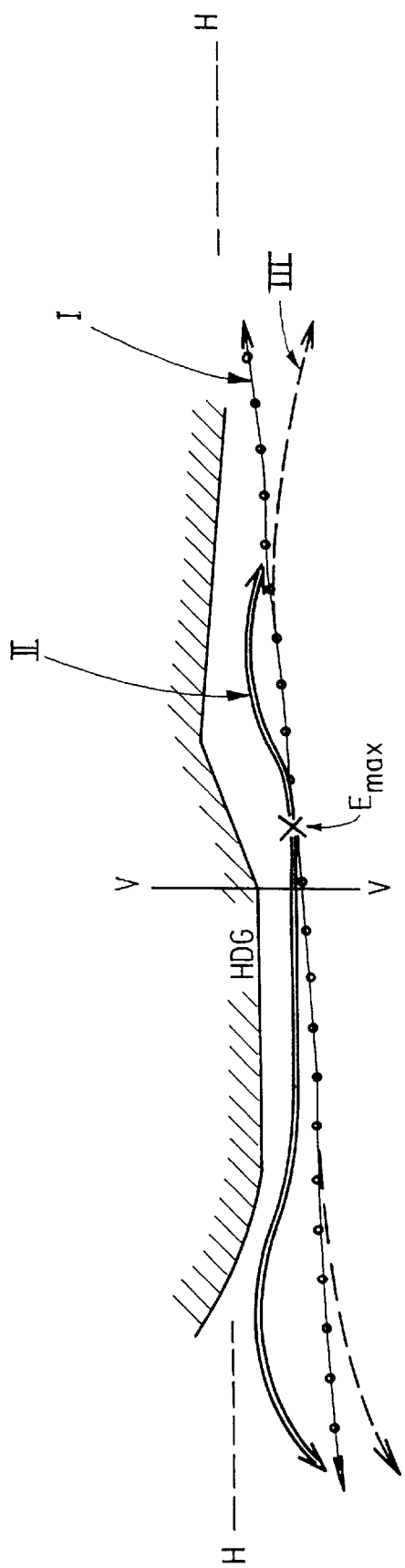
FIG. 4 is a diagrammatic illustration of the respective paths of motion of the maximum light intensities produced by the headlight according to the invention during straight and curved travel of the vehicle.

FIG. 4 shows the possible respective paths of the location of the maximum illumination intensity $E_{max}$ in the light beam produced by the above-described projection headlight.

The horizontal line H—H and the light-dark boundary HDG of the headlight are shown. The point of greatest illumination intensity in front of the reflector, $E_{max}$, is indicated by a cross in FIG. 4. It can travel under the light-dark boundary HDG on the path indicated with 11 in FIG. 4 in the case of the headlight illustrated in FIG. 3 with vertical guidance of the reflector 10 on the cam wheel 34. The path, which provides the greatest illumination intensity $E_{max}$ with a transverse inclination of the rotation axis to the left, is illustrated with the solid line and labeled 1. The path of the maximum illumination intensity $E_{max}$ with a transverse inclination of the rotation axis is shown with a dashed line labeled III.

Figure 5:
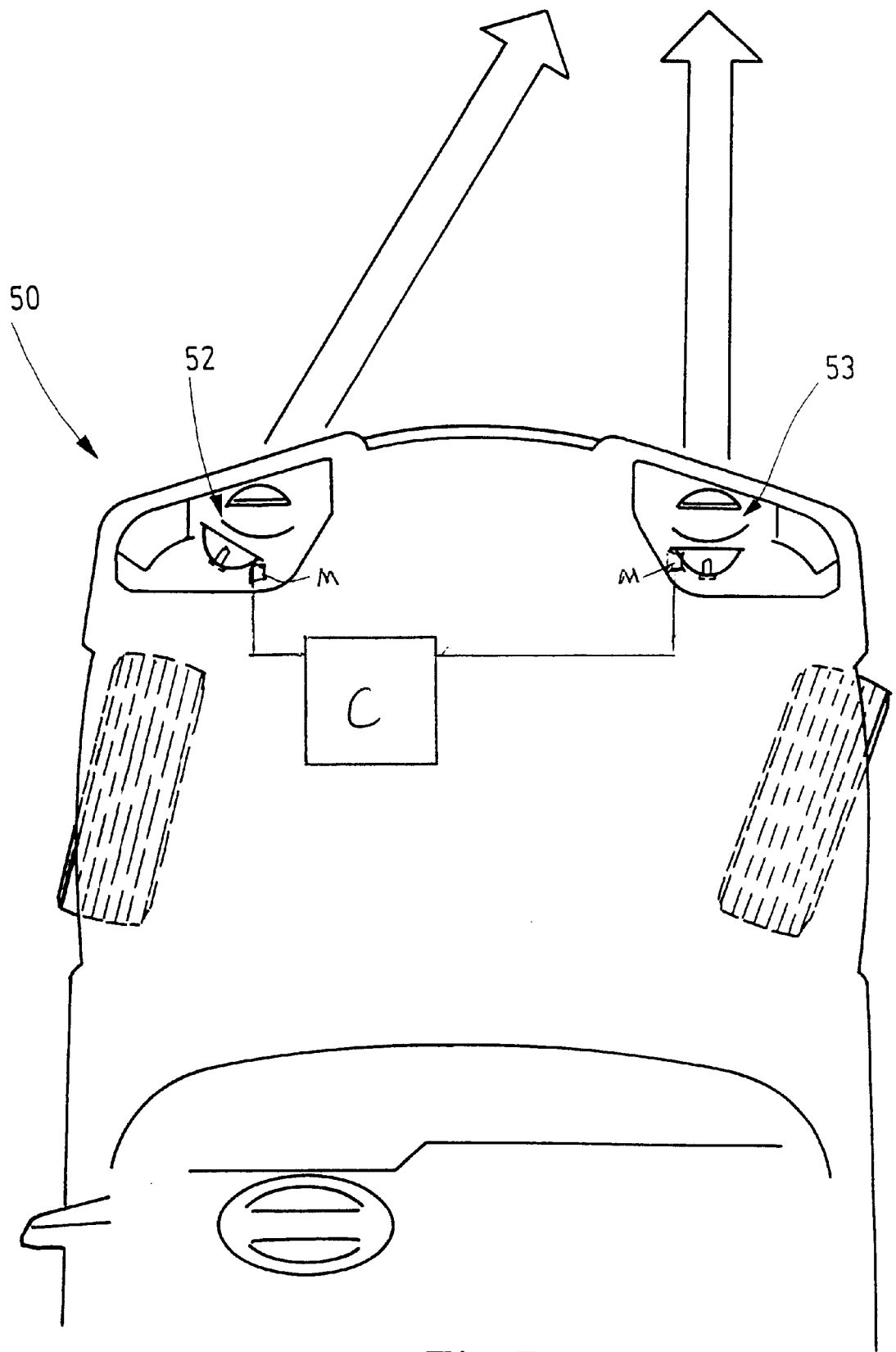
FIG. 5 is a diagrammatic view of the front of a motor vehicle showing the orientation of the front vehicle tires and the headlights in the illumination device according to the invention.

An illumination device 50 for a vehicle, as shown in FIG. 5, includes at least two of the above-described projection headlights 52,53, which are controllable independently of each other according to a travel situation or motion state of the vehicle. Independently operated drives M are provided for the respective reflectors of the headlights 52,53 and engaged on the reflectors as shown in FIG. 3. These independent drives M are controlled by a controller C, which sends control signals to active and deactivate the drives M to rotate the reflectors 10 independently of each other. In FIG. 5 a traffic situation is shown in which the pivoting of the headlight 52 on the outside of the curve is controlled according to the radius of curvature, while the headlight 53 on the inside of the curve is not pivoted. In this way an intense broad total illumination is obtained by a superposition of the light beam of the headlight 52 on the outside of the curve and the light beam of the headlight 53 on the inside of the curve. The illumination of the right travel path is particularly widened and improved with very tight right curves and reduced vehicle travel width, which occur e.g. on typical streets.

FIGS. 6a and 6b shows the individual light intensity distribution of the left or right headlight shown in FIG. 5, i.e. the light intensities as a function of horizontal and vertical angle.

FIGS. 7a and 7b illustrate the total illumination intensities, i.e. the combined light intensity distributions of both headlights, as a function of horizontal and vertical angle. The vehicle travel width in the embodiment selected in FIGS. 6a and 6b and 7a and 7b amounts to 5 m. Headlight height amounts to 0.65 meter. A right curve with a radius of 40 m was used in this illustration.

By "crossing" both light intensity distributions of the right and left headlights 52 and 53 the direction and width of the long-range zones of the combined light beam of the vehicle can be influenced independently of the travel curvature.

For example, the axes of both individual light distributions, i.e. the rotation angle of both reflectors 10, are aligned parallel to the road edges during rapid and straight travel so that an especially long range beam is obtained.

With a wide street or during slow travel the light beam axes are crossed at angles up to 20°, i.e. the reflectors 10 are rotated relative to each other until at an angle of 20°, so that an improved lateral illumination is obtained. This can be achieved by rotation of only one or both reflector axes.

The above type of superimposed control of the rotary motion of the light distributions can be achieved, for example by a speed-dependent control signal or another control signal, which characterizes the travel state of the vehicle in addition to the curve-dependent control.

The above-described manner of operation of the headlights can also be employed with other rotatable headlight pairs, for example, with the so-called (not illustrated) "spot" lights. Their combined light beam can be widened by about a factor of 2 in comparison to that of an individual beam or brightened by about a factor of 2 by shifting the center of their beams over each other in contrast to the intensity of an individual beam. When two such individual beams are available, the lateral total illumination width can be further increased or instead the combined light intensities can be increased. In combination with a vertical adjustment of the individual light beam, as e.g. by means of separately controllable width regulating device in the light-producing optical units, the combined intensity distributions can be adjusted for additional requirements.

The disclosure in German Patent Application 199 46 350.6 of Sep. 28, 2000 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a projection headlight and illumination device for a motor vehicle containing same, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims:

I claim:

1. A projection headlight for a vehicle, said projection headlight comprising a reflector (10) having a peak region (P), a light source (20) mounted in the reflector (10) in said peak region of the reflector, at least one stop or mask (30) arranged in front of the reflector and a projection lens (40) arranged in front of the at least one stop or mask;

wherein the reflector (10) and the light source (20) are pivotally mounted and connected with each other so as to rotate together about a rotation axis (60) and said rotation axis (60) is arranged in the vicinity of a second principal point of the projection lens (40).

2. The projection headlight as defined in claim 1, wherein said rotation axis (60) is vertically oriented.

3. The projection headlight as defined in claim 1, wherein the at least one stop or mask is formed to have a Petzval curvature with respect to the projection lens (40).

4. The projection headlight as defined in claim 1, wherein said rotation axis (60) is inclined relative to a vertical orientation in a rearward direction.

5. The projection headlight as defined in claim 1, wherein said rotation axis (60) is inclined rearward relative to vertical at an inclination angle of about 3° to 10° when said reflector is horizontally pivotable over a horizontal pivot angle range of up to ±25°.

6. The projection headlight as defined in claim 1, wherein said rotation axis (60) is inclined rearward relative to vertical at an inclination angle of up to ±10° when said reflector is horizontally pivotable over a horizontal pivot angle range of up to ±40°.

7. The projection headlight as defined in claim 1, wherein the rotation axis (60) is inclined from a vertical orientation transversely to a longitudinal axis (70) of the vehicle, said rotation axis (60) is inclined from vertical to left of the longitudinal axis for right-hand traffic or from vertical to right of the longitudinal axis for left-hand traffic.

8. The projection headlight as defined in claim 7, wherein the rotation axis (60) is inclined from vertical transversely to said longitudinal axis (70) at an inclination angle of about 3° to 10° when said reflector is horizontally pivotable over a horizontal pivot angle range of up to ±25°.

9. The projection headlight as defined in claim 7, wherein the rotation axis (60) is inclined from vertical transversely to said longitudinal axis (70) at an inclination angle of about 1.5° to 3° when said reflector is horizontally pivotable over a horizontal pivot angle range of up to ±10°.

10. The projection headlight as defined in claim 1, wherein said rotation axis (60) is inclined in a lateral direction across or transverse to a longitudinal axis (70) of said vehicle as well as in a rearward direction relative to vertical.

11. The projection headlight as defined in claim 1, further comprising bearings (11,12) on which said reflector (10) is mounted and means for moving at least one of said bearings in a longitudinal direction.

12. The projection headlight as defined in claim 1, further comprising a cam wheel (34) and means for pivoting said reflector (10) along said cam wheel (34).

13. An illumination device for a vehicle, said illumination device comprising at least two projection headlights, wherein each of said at least two projection headlights comprises a reflector (10) having a peak region (P), a light source (20) arranged in the peak region of the reflector, at least one stop or mask (30) arranged in front of the reflector and a projection lens (40) arranged in front of the stop or mask, the reflector (10) and the light source (20) being pivotally mounted and connected with each other so as to rotate together about a rotation axis (60) and said rotation axis (60) being arranged in the vicinity of a second principal point of the projection lens (40); and means (C,M) for controlled rotation of said reflectors of said at least two headlights independently of each other, whereby light beams from said projection headlights are propagated in respective directions independently of each other.

14. The illumination device for a vehicle as defined in claim 13, wherein, when said vehicle is traveling on a curved path, said means (C,M) for controlled rotation rotates only one of said reflectors of said at least two headlights and said one of said at least two headlights including said reflector that is pivoted is on a side of said vehicle closest to an outside of said curved path.

15. The illumination device for a vehicle as defined in claim 13, wherein, when said vehicle is traveling at a speed above a predetermined limiting speed, said means (C,M) for controlled rotation of said reflectors pivots said reflectors so that light beams from said headlights are essentially parallel to each other and, when said vehicle is traveling at another speed below said predetermined limiting speed, said means (C,M) for controlled rotation of said reflectors pivots said reflectors, so that said light beams cross each other.

* * * * *